United States Patent
Hanrahan et al.

[19]

[11] Patent Number: 6,033,755
[45] Date of Patent: Mar. 7, 2000

[54] BASE PLATE FOR SUSPENSION ASSEMBLY IN HARD DISK DRIVE WITH TAPERED INNER BARREL

[75] Inventors: Kevin Hanrahan; Ryan Schmidt, both of Santa Barbara, Calif.

[73] Assignee: Intri-Plex Technologies, Inc., Goleta, Calif.

[21] Appl. No.: 08/931,804

[22] Filed: Sep. 16, 1997

[51] Int. Cl.[7] .............. B32B 3/10; B21B 37/00; G11B 5/48; B21D 39/00
[52] U.S. Cl. .......... 428/131; 428/596; 428/599; 360/104; 29/523
[58] Field of Search .................. 428/596, 599, 428/131; 360/104; 29/523

[56] References Cited

U.S. PATENT DOCUMENTS

| | | | |
|---|---|---|---|
| 4,991,045 | 2/1991 | Oberg | 360/104 |
| 5,461,524 | 10/1995 | Jurgenson | 360/104 |
| 5,646,802 | 7/1997 | Akiyama et al. | 360/104 |
| 5,689,389 | 11/1997 | Braunheim | 360/104 |
| 5,717,545 | 2/1998 | Brooks, Jr. et al. | 360/104 |
| 5,870,254 | 2/1999 | Baserman et al. | 360/104 |
| 5,872,687 | 2/1999 | Arya et al. | 360/104 |
| 5,879,578 | 3/1999 | Chung et al. | 216/100 |

*Primary Examiner*—Paul Thibodeau
*Assistant Examiner*—Holly C. Rickman
*Attorney, Agent, or Firm*—Owen L. Lamb

[57] ABSTRACT

A base plate wherein the inner barrel of the base plate hub is comprised of two distinct zones. The first zone is an inner diameter sized for use with standard tooling pins in an assembly process as a metric for size control. The second zone is a taper for distributing tension swage force and plastic strain toward the rear part of the hub by making the hub stiffer as the swage ball proceeds downward through the barrel, and for distributing compression swage force and plastic strain toward the rear of the hub by relieving stiffness as the swage ball proceeds upward. A back side slope is provided to prevent washed metal from creating added swage force and plastic strain during swaging in the compression direction. The base plate has a minimal counter bore, a lead-in chamfer which is shallower than typical, a second lead-in chamfer which is very steep and upon which the ball begins to swage, a small inner diameter region to allow for tooling during assembly, and a tapered backside to reduce unneeded material.

18 Claims, 3 Drawing Sheets

BASE PLATE FOR SUSPENSION ASSEMBLY IN HARD DISK DRIVE WITH TAPERED INNER BARREL

BACKGROUND OF THE INVENTION

1. Field of the Invention

This invention relates to disk head assemblies for supporting read/write heads adjacent rotating disks in disk drives and more particularly, to a base plate for attaching a load beam assembly to a head actuator arm.

2. Description of the Prior Art

In hard disk drives data are stored on magnetizable surfaces of a plurality of rotatable disks that are mounted in a coaxial stack on a housing of the drive. Transducer heads that write to and read data from the disk surfaces are supported by an actuator that is mounted on the housing and can be actuated to position the transducer heads in alignment with concentric data tracks defined on the disks. Each transducer head is attached to one end of a transducer support arm that is connected to an actuator arm that extends from the actuator body. The support arms include a flexible load beam constructed of light sheet steel that will flex sufficiently to permit air turbulence caused by the rotating disks to lift the heads slightly off of the disks so that the heads fly on an air bearing across the disk surfaces.

In the past, head-carrying load beams have been attached to the actuator arms using base plates that form a part of the transducer support arms. Each base plate includes a flat flange portion and a cylindrical hub portion or boss. The base plate hub is passed through a load beam boss hole and the flange is spot welded to the load beam. The combined base plate and load beam is called a transducer support arm, and each support arm has the hub of the base plate extending through and beyond the load beam boss hole.

The hubs of two support arms are inserted into each of a series of actuator arm boss holes formed through a plurality of actuator arms extending from the actuator body, one hub entering an actuator arm boss hole from each end of the hole. A swage ball is passed through the cylindrical hubs to force the peripheries of the hubs to expand (swage) into tight engagement with the inner peripheries of the actuator arm boss holes. Thus, each actuator arm carries two support arms on opposite sides thereof to support two transducer heads in opposing directions in close proximity with the surfaces of two disks in the assembled hard disk drive.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer support arms has been made more difficult as the thickness of the components has become smaller.

Because of the joining of two transducer support arms to each actuator arm by passing a ball through two hubs in the same hole in the actuator arm, an asymmetry exists in the forces that are exerted on the hubs to make the joints. Because the transducers face in opposite directions, the hubs on their respective load beams also extend in opposite directions with respect to the direction of passage of the ball through the inner diameters of the hubs. For one transducer support arm, the ball is passed in a direction that tends to place the hub in compressive stress while, for the other transducer support arm, the direction of passage of the ball is such as to tend to place the hub in tensile stress. Placing a hub in tensile stress during the swaging operation that joins the transducer support arms to an actuator arm will often result in a weak joint between the hub and the actuator boss hole. In order to prevent rupturing of the hub, resulting in a weak joint, the expansion of the hub during swaging must be limited and such limitation will limit the contact forces between the hub and the actuator arm boss hole periphery, forming a weak joint.

An important measure is the gram load parameter at the transducer slider of a load beam before and after swaging. In the prior art, transducer sliders on load beams swaged in the tension direction do not exhibit the same performance as transducer sliders on load beams swaged in the compression direction. What is desired is a head stack for which the same amount of force is transmitted to the slider from the load beam, that is the same gram load. For example, when a swage ball is run through the head stack, the gram force may gain +0.4 grams in the tension direction and lose −0.1 grams in the compression direction. If the target gram load force for each slider is 3.5 grams, in the prior art it has been necessary to start with 3.6 grams for compression direction load beams and 3.1 grams for tension direction load beams in order to achieve the same target gram load force for all sliders in the head stack. This complicates the manufacturing process. What is needed is a base plate that does not lose or gain gram load as a result of the swaging process, and is the same for both the tension swage direction and the compression swage direction.

It is therefore an object of this invention is to provide a base plate that exhibits similar swage performance in the tension and compression swage directions.

SUMMARY OF THE INVENTION

This invention is concerned with a base plate geometry wherein the inner barrel of the base plate hub is comprised of two distinct zones. A first zone is an inner diameter sized for use with standard tooling pins in an assembly process as a metric for size control. A second zone is a taper for distributing tension swage force and plastic strain toward the rear part of the hub by making the hub stiffer as the swage ball proceeds downward through the barrel, and for distributing compression swage force and plastic strain toward the rear of the hub by relieving stiffness as the swage ball proceeds upward. A third zone including the base plate flange and an upper part of the hub is providing to support the second zone.

A fourth zone including a back side slope may be provided to prevent washed metal from creating added swage force and plastic strain during compression.

More specifically, the base plate geometry has a minimal counter bore, a lead-in chamfer which is shallower than typical, a second lead-in chamfer which is very steep and upon which the ball begins to swage, a small inner diameter region to allow for tooling during assembly, and a tapered backside to reduce unneeded material. The geometry provides that in tension, the swage force and plastic strain build up slowly so that there exists a strain hardened area between the contact zone and the flange by the time the ball really begins to work thus isolating the flange region and the lower region of the hub. In compression, the ball immediately builds plastic strain energy while the ball is far away from the flange and by the time the ball gets near the flange, the barrel diameter has enlarged creating a less intense plastic flow thus reducing the plastic strain near the critical flange area.

The invention has the advantage that when swaging in the tension direction, the swage force and plastic strain build up slowly so that there exists a strain hardened area between the swage ball contact zone and the flange by the time the ball really begins to work thus isolating the hub and flange regions. When swaging in the compression direction, the ball immediately builds plastic strain energy while the ball is far away from the flange. By the time the ball gets near the flange, the barrel diameter of the hub has enlarged creating a less intense plastic flow thus reducing the plastic strain near the critical flange area.

An advantage of this invention is that it allows the use of a base plate in the tension and compression swage directions with similar swage performance.

An advantage of this invention is that a superior retention torque to swage force ratio is achieved with a lower gram load change.

BRIEF DESCRIPTION OF THE DRAWINGS

The invention will be described in greater detail with reference to the drawings in which:

FIG. 1b is side elevation view of a base plate of FIG. 1a;

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
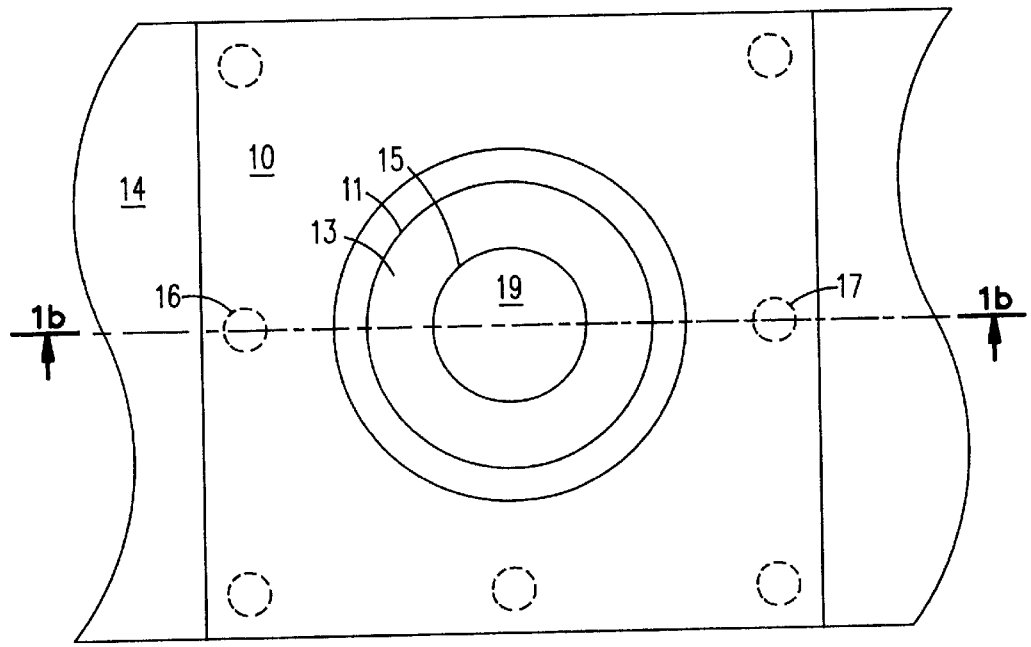
FIG. 1a is top view of a base plate of the prior art.
Figure 1B:
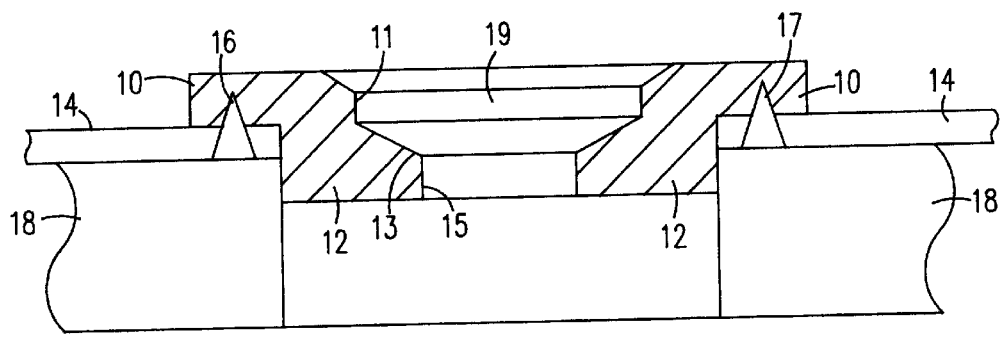

Refer to FIGS. 1a and 1b which illustrate a base plate of the prior art. An actuator arm and load beam, which are elements of an actuator arm assembly, are connected end to end by the base plate. The base plate includes a flat flange portion 10 and a cylindrical hub portion or boss 12. A base plate typically has an inner barrel shape with a counter bore 11, a lead-in chamfer 13 and an inner diameter 15. The counter bore and inner diameter are perpendicular to the plane of the base plate flange 10. In assembling the actuator arm, the hub 12 is inserted through a load beam boss hole in a load beam 14 and the flange portion 10 is welded 16, 17, to the load beam. The hub is then inserted through an actuator arm boss hole in the actuator arm 18. A swage ball tool is passed through the center inner barrel 19 of the hub 12 causing pressure to be applied to cause the hub 12 to expand into the boss hole in the actuator arm, rigidly connecting the hub and attached load beam to the actuator arm boss hole.

Figure 2:
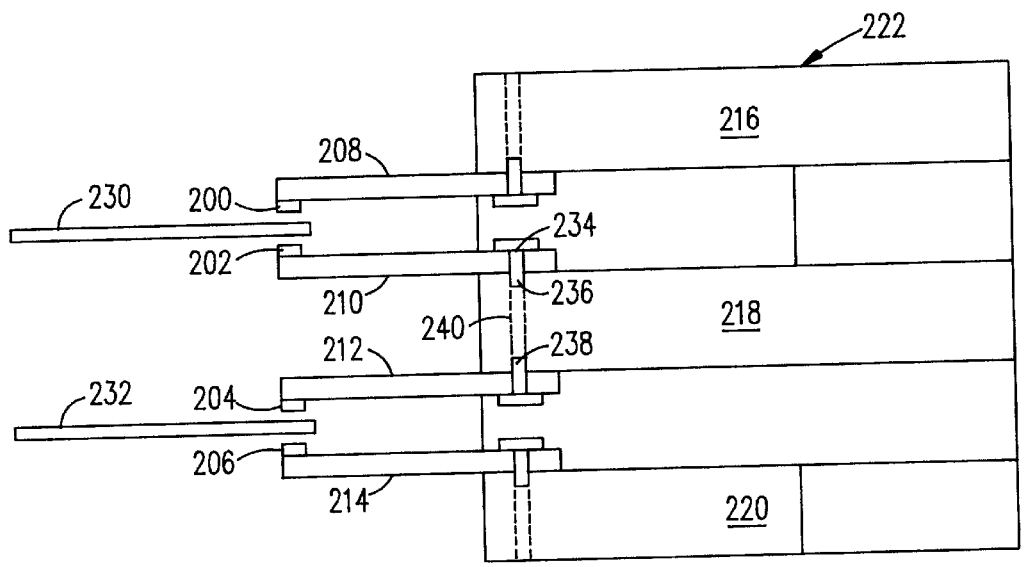
FIG. 2 is an illustration of a technique for swaging a stack of head support assemblies to actuator arms.

FIG. 2 is an illustration of a technique for swaging a stack of head support assemblies to actuator arms. Transducer heads 200, 202, 204, 206, are attached to the ends of transducer support arms 208, 210, 212, 214. The transducer support arms are connected to actuator arms 216, 218, 220 that extend from the actuator body 222. Each support arm includes a flexible load beam constructed of light sheet steel that will flex sufficiently to permit air turbulence caused by the rotating disks 230, 232, to lift the heads slightly off of the disks so that the heads fly across the disk surfaces on an air bearing.

For example, the load beam of arm 210 is attached to the actuator arm 218 using a base plate 234, 236, that forms a part of the transducer support arms. The base plate includes a flat flange portion 234 and a cylindrical hub 236. The base plate hub 236 is passed through a load beam boss hole and the flange 234 is spot welded to the load beam 210. The combined base plate and load beam is called a transducer support arm, and each transducer support arm has the hub of a base plate extending through and beyond the load beam boss hole. The cylindrical hubs 236, 238, of the two support arms 210, 212, are inserted into actuator arm boss hole 240 formed through the actuator arm 218, one hub entering the actuator arm boss hole from each end of the hole 240.

A swage ball is passed through the barrels of all of the cylindrical hubs, once in each direction, to force the peripheries of the hubs to expand (swage) into tight engagement with the inner peripheries of the corresponding actuator arm boss holes. For example, the actuator arm 218 carries two support arms 210, 212, on opposite sides thereof to support two transducer heads 202, 204, in opposing directions in close proximity with the surfaces of the two disks 230, 232, in the assembled hard disk drive.

Because of the joining of two transducer support arms to the actuator arm by passing a ball through two hubs in the same hole in the actuator arm, an asymmetry exists in the forces that are exerted on the hubs to make the joints. Because the transducers face in opposite directions, the hubs on their respective load beams also extend in opposite directions with respect to the direction of passage of the ball through the inner barrels of the hubs. For one transducer support arm, the ball is passed in a direction that tends to place the hub in compressive stress while, for the other transducer support arm, the direction of passage of the ball is such as to tend to place the hub in tensile stress. Placing a hub in tensile stress during the swaging operation that joins the transducer support arms to an actuator arm will often result in a weak joint between the hub and the actuator boss hole. In order to prevent rupturing of the hub, resulting in a weak joint, the expansion of the hub during swaging must be limited and such limitation will limit the contact forces between the hub and the actuator arm boss hole periphery, forming a weak joint.

Figure 3:
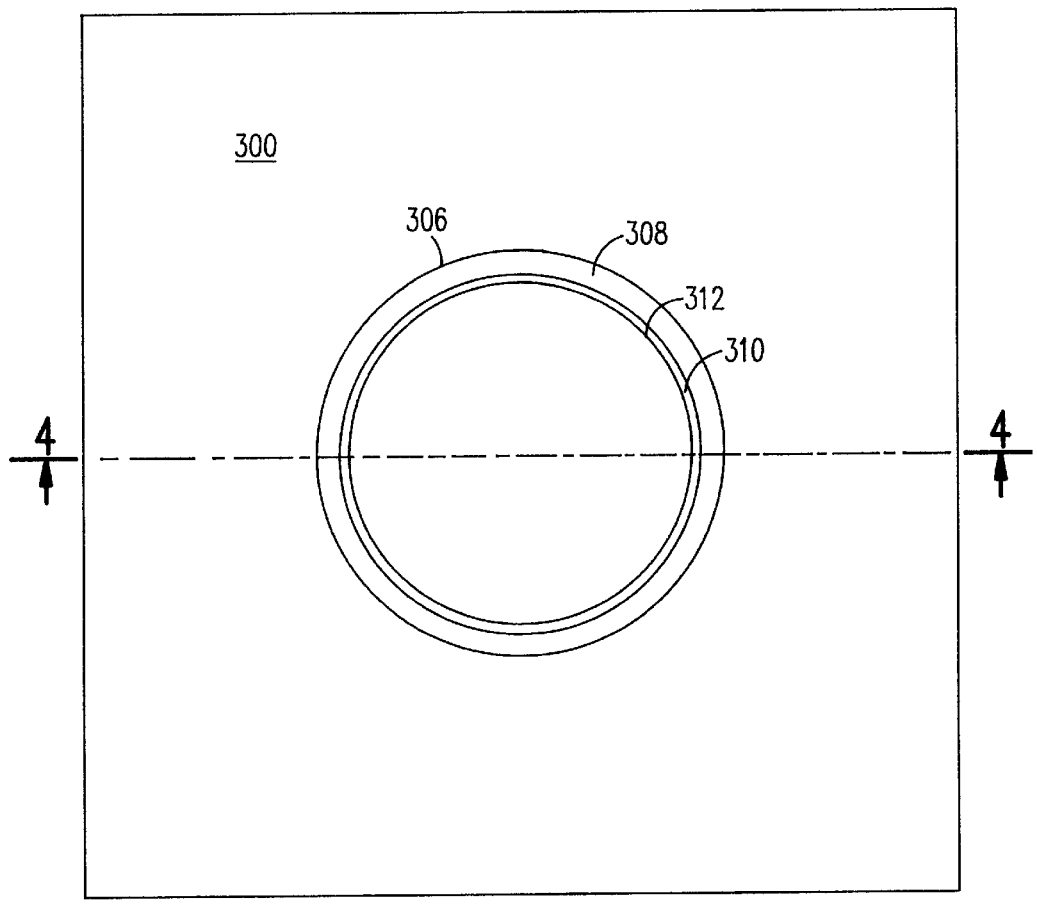
FIG. 3 is top view of a base plate of the invention.
Figure 4:
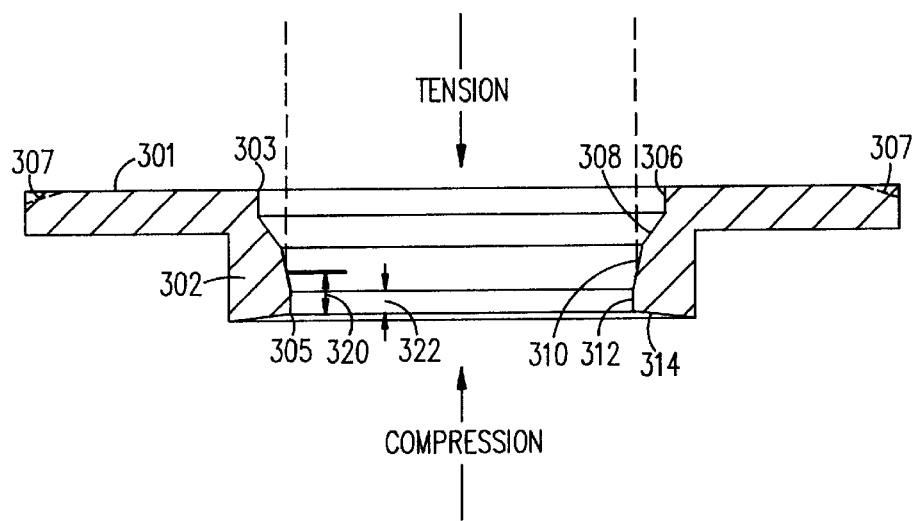
FIG. 4 is side elevation view of the base plate of FIG. 3 along the view line 4—4; and, FIG. 5 is a simplified illustration of the FIG. 4 side elevation view of the base plate.

Refer to FIG. 3 which is top view of a base plate in accordance with the invention and FIG. 4 which is side elevation view of the base plate of FIG. 3 along the view line 4—4.

The base plate includes a flat flange portion 300 and a cylindrical hub portion or boss 302. The hub has an inner barrel having a top end 303 and a bottom end 305. The inner barrel has a minimal counter bore 306, a first lead-in chamfer 308 which is shallower than typical, a second lead-in chamfer 310 which is very steep and upon which the swage ball begins to swage, a small inner diameter region 312 to allow for tooling during assembly, and a tapered backside 314 to reduce unneeded material and provide room for the lower hub region to grow during swaging in the tension direction, in the direction of the arrow labeled "tension" in FIG. 4. The counter bore 306 and inner diameter 312 are perpendicular to the plane of the base plate flange 300. The flange 300 may have an edge taper shown by the broken lines 307, as a result of a stamping process. The first lead-in chamfer 308 is between 40 degrees and 70 degrees from horizontal and the second lead-in chamfer 310 is between 60 degrees and 85 degrees from horizontal. The second lead-in chamfer is of such dimensions as to provide more than 25% of total strain energy upon swaging. Preferably the first lead-in chamfer is about 57 degrees and the second lead-in chamfer is about 73 degrees.

When a swage ball is forced through the inner barrel in the tension direction, the swage force and plastic strain build up slowly so that there exists a strain hardened area between the swage ball contact zone, near the midpoint of the second lead-in chamfer 310, where the swage ball first encounters the hub barrel, and the flange 300 by the time the ball really begins to work, thus isolating the flange region and the hub region. The swage ball engagement path is shown by the two broken lines spaced apart equal to the diameter of the swage ball. In the base plate geometry of the present invention, the land height 320 (the height of the inner diameter 312 measured from the bottom of the inner barrel) is less than half of the engagement height 322 (the height measured from the bottom of the inner barrel to the point of engagement of the swage ball on the second lead-in chamfer 310). The purpose of this geometry is so that when the swage ball is driven through the barrel of the hub, the part will behave so as to keep the stress as far away from the flange as possible. In the base plate geometry of the prior art, the land height takes up more than half of the engagement height.

Figure 5:
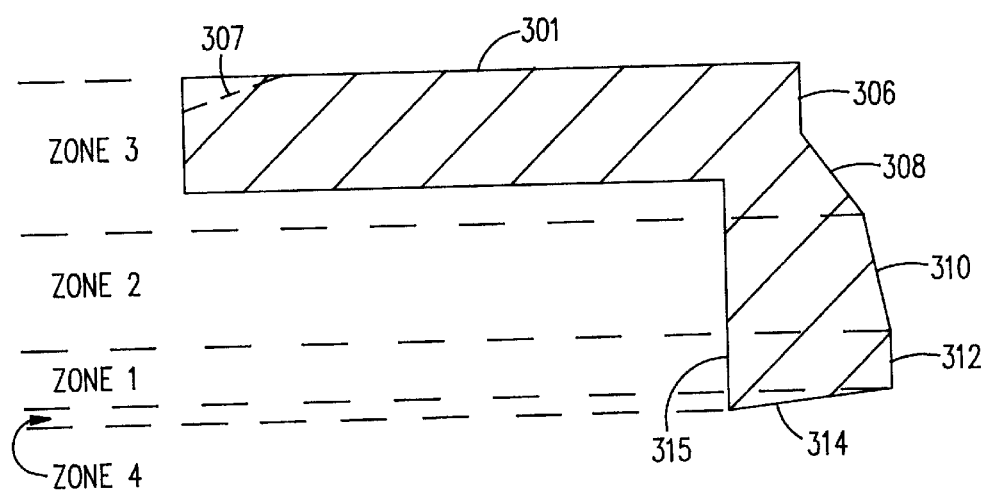

Refer to FIG. 5 which is a simplified illustration of the FIG. 4 side elevation view of the base plate. The invention can be understood by dividing the base plate into a number of zones. Zone 1, between the bottom of the hub 314 and the end of the inner diameter portion 312 of the hub, provides a standard inner diameter surface for tooling. Zone 2, contiguous with zone 1, is above the inner diameter surface 312 and including the chamfer 310, functions during swaging in both the tension and compression direction to transmit strain energy to the rear 315 of the hub and away form the inner barrel to more efficiently distribute the plastic strain. Zone 3, contiguous with zone 2, between the chamfer 310 and the top surface of the flange 301, serves to bolster zone 2 where the swaging work is done. Zone 4, inclusive of the tapered backside 314, functions to prevent the accumulation of excess and wasteful material.

The base plate of FIG. 3 is distended after swaging in the tension direction. The lower region will have grown to displace and eliminate the tapered backside 314 of FIG. 3. When a swage ball is forced through the hub in the compression direction, in the direction of the arrow labeled "compression" in FIG. 4, the ball will immediately build plastic strain energy while the ball is far away from the flange. By the time the ball gets near the flange, the forces will have enlarged the inner barrel diameter, creating a less intense plastic flow, thus reducing the plastic strain near the critical flange area.

While the invention has been particularly shown and described with reference to preferred embodiments thereof, it will be understood by those skilled in the art that the foregoing and other changes in form and detail may be made therein without departing from the scope of the invention.

What is claimed is:

1. A base plate including a flange portion and a cylindrical hub portion perpendicular to a horizontal plane of said flange, an inner barrel of said hub comprising:
   a counter bore;
   a first lead-in chamfer contiguous with said counter bore, said first lead-in chamfer being between 40 degrees and 75 degrees from horizontal; and,
   a second lead-in chamfer contiguous with said first lead-in chamfer, said second lead-in chamfer being between 60 degrees and 85 degrees from horizontal, said second lead-in chamfer being steeper than said first lead-in chamfer and forming a swage surface upon which a swage ball can swage.

2. The base plate of claim 1 further comprising:
   an inner diameter region contiguous with said second lead-in chamfer.

3. The base plate of claim 2 further comprising:
   a tapered backside.

4. The base plate of claim 1 wherein said second lead-in chamfer is 73 degrees.

5. The base plate of claim 2 wherein said second lead-in chamfer is 73 degrees.

6. The base plate of claim 3 wherein said second lead-in chamfer is 73 degrees.

7. The base plate of claim 4 wherein said first lead-in chamfer is 57 degrees.

8. The base plate of claim 5 wherein said first lead-in chamfer is 57 degrees.

9. The base plate of claim 6 wherein said first lead-in chamfer is 57 degrees.

10. The base plate of claim 1 wherein said second lead-in chamfer is of such dimensions as to provide more than 25% of total strain energy upon swaging.

11. The base plate of claim 2 wherein said second lead-in chamfer is of such dimensions as to provide more than 25% of total strain energy upon swaging.

12. The base plate of claim 3 wherein said second lead-in chamfer is of such dimensions as to provide more than 25% of total strain energy upon swaging.

13. A base plate having a flange and a hub with an inner barrel, said hub being perpendicular to a horizontal plane of said flange, said base plate comprising:
   a first zone within said hub, said first zone having an inner diameter within said inner barrel;
   a second zone within said hub, said second zone having a geometry of a taper, said taper being between 60 degrees and 85 degrees from horizontal; and,
   a third zone including said flange and an upper part of said hub for supporting said second zone.

14. The base plate of claim 13 further comprising:
   a fourth zone contiguous with said first zone, said fourth zone including a back side slope.

15. The base plate of claim 13 wherein said second zone is of such dimensions as to provide more than 25% of total strain energy upon swaging.

16. The base plate of claim 14 wherein said second zone is of such dimensions as to provide more than 25% of total strain energy upon swaging.

17. A base plate having a flange and a hub with an inner barrel, said hub being perpendicular to a horizontal plane of said flange, said inner barrel having a top end contiguous with said flange and a bottom end opposite said top end, comprising:
   a counter bore at said top end;
   a first lead-in chamfer contiguous with said counter bore, said first lead-in chamfer being between 40 degrees and 75 degrees from horizontal;
   a second lead-in chamfer contiguous with said first lead-in chamfer, said second lead-in chamfer being between 60 degrees and 85 degrees from horizontal, said second lead-in chamfer being steeper than said first lead-in chamfer and forming a swage surface upon which a swage ball of a given ball diameter can swage;
   an inner diameter region contiguous with said second lead-in chamfer;
   a land height of said inner diameter region being a land height measured from said bottom end to said second lead-in chamfer,
   an engagement height being an engagement height measured from said bottom end to a point of engagement of said swage ball on said second lead-in chamfer,
   said land height being less than half of said engagement height.

18. The base plate of claim 17 further comprising:
   a tapered backside at said bottom end.

* * * * *